Oct. 14, 1952     E. F. BRUMMERSTEDT     2,614,034
CATALYST VESSEL

Filed Feb. 1, 1947     2 SHEETS—SHEET 1

INVENTOR
EGON F. BRUMMERSTEDT
BY E. Francis Wentworth Jr.
ATTORNEY

Oct. 14, 1952 — E. F. BRUMMERSTEDT — 2,614,034
CATALYST VESSEL
Filed Feb. 1, 1947 — 2 SHEETS—SHEET 2
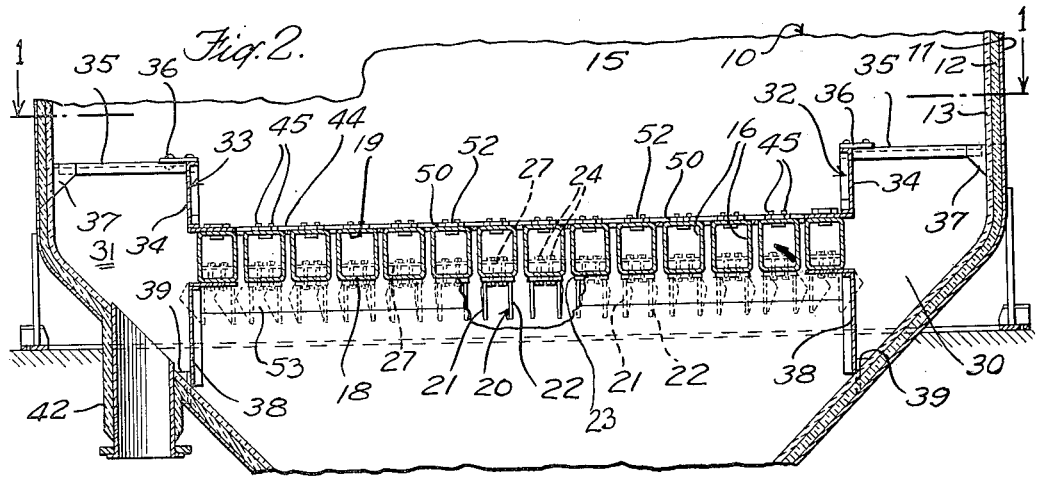
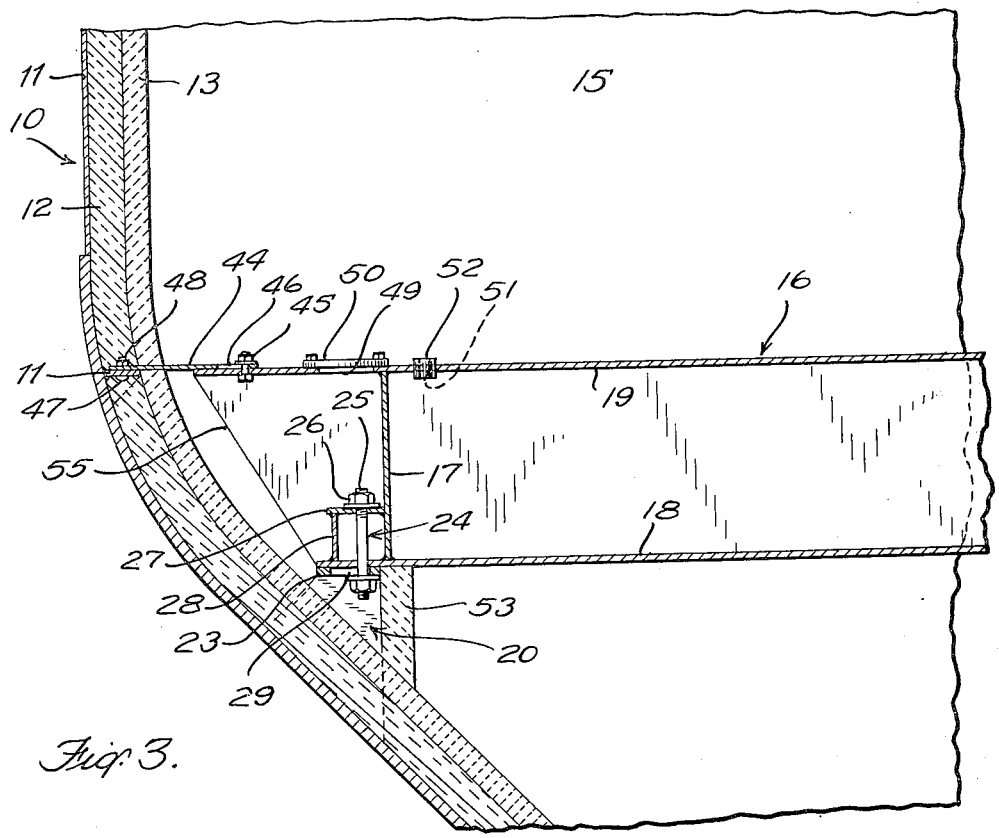
INVENTOR
EGON F. BRUMMERSTEDT
BY E. Francis Wentworth Jr.
ATTORNEY Patented Oct. 14, 1952

2,614,034

UNITED STATES PATENT OFFICE 2,614,034

CATALYST VESSEL

Egon F. Brummerstedt, New York, N. Y., assignor to Foster Wheeler Corporation, New York, N. Y., a corporation of New York Application February 1, 1947, Serial No. 725,850

17 Claims. (Cl. 23—288)

This invention relates to catalyst chambers and more particularly to catalyst chambers used in the catalytic conversion of hydrocarbon oil and grids for said chambers.

In catalyst chambers used in the catalytic conversion of hydrocarbon oil, it is usual, particularly in catalyst regenerators, to provide a perforated bottom plate or grid through which the incoming catalyst and oil mixture enters the chamber and is distributed therein. The bottom plate also serves as a support for the catalyst bed when the process is not in operation and flow into the chamber has ceased. The bottom plate, therefore, must take loads acting thereon in opposite directions, that is, the load created in supporting the catalyst within the chamber when flow thereinto has ceased and also the load created by the upward pressure of the incoming catalyst and oil mixture. Normally, the bottom plate or grids of such catalyst chambers are flat perforated plates and require a complicated and rigid series of support trusses and columns to maintain it in position.

The present invention provides a catalyst chamber grid adjacent the bottom of said chamber in which intermediate supports are eliminated, said grid being constructed and arranged to expand without undue vertical movement or vibration, and without damage to the shell or lining of the catalyst vessel.

This invention also provides a catalyst chamber grid which may more easily be installed and also more readily removed for replacement than the above-mentioned usual bottom plate for catalyst regenerators. Repairs may be made quickly at the site of the catalyst chamber than with said above-mentioned bottom plates.

The present invention further provides a catalyst chamber grid which is economical to install and to maintain and has great flexibility insofar as the area of the openings therein is concerned since said area may readily be varied over a wide range.

The invention will be understood from the following description when considered in connection with the accompanying drawings forming a part thereof, and in which:

Fig. 2 is a sectional view taken on the line 2—2 of Fig. 1;

Fig. 3 is a sectional view taken on the line 3—3 of Fig. 1 but on an enlarged scale.

Like characters of reference refer to like parts throughout the several views.

Figure 1:
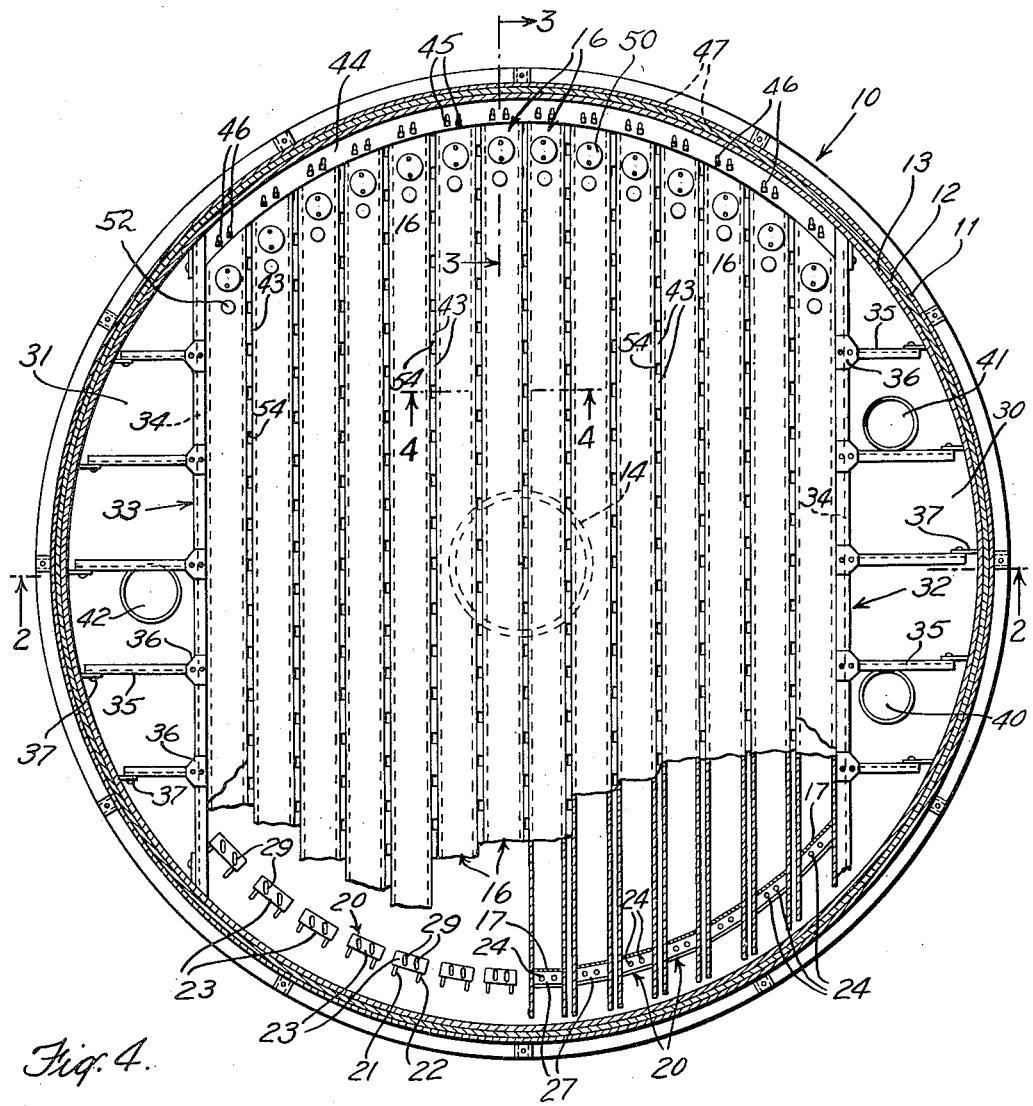
Fig. 1 is a transverse sectional view of a catalyst vessel embodying the present invention taken on the line 1—1 of Fig. 2.

Referring to the drawings, the reference numeral 10 indicates a cylindrically-shaped catalyst vessel, for example a regenerator or a reactor, having an outer metallic shell 11 which is lined with a layer of insulating material 12. Inwardly of the layer of insulating material is a tile lining 13. The bottom of the vessel 10 is in the form of an inverted truncated cone and has an opening 14 at the apex thereof. The vessel is closed at the top, not shown, thereby forming an enclosed chamber 15.

A grid bottom or floor is formed within the chamber 15 in spaced relationship with the opening 14 and comprises a plurality of rectangular-shaped hollow beams or girders 16 which extend transversely of the chamber and are spaced from one another in substantially the same horizontal plane such distance as to form a longitudinally extending slot between adjacent beams which slot is relatively narrow in comparison to the width of said beams. The beams are of a metallic material and of such length that the opposite ends are closely adjacent but in spaced relationship with the inner periphery of the tile lining 13. The ends of the girders are cut at an angle, as shown at 55 Fig. 3, to conform to the general configuration of the bottom of vessel 10 so that the spaced relationship between the ends of the girders and the tile lining 13 will be maintained throughout the depth of the girder. Girders 16 are closed in a fluid-tight manner adjacent the opposite ends thereof by end plates 17 which end plates extend substantially vertically and are in spaced relationship with the end of bottom 18 and top 19 of the girder.

Girders 16 are each supported at the opposite ends thereof by supports 20 comprising spaced substantially vertically extending side members 21 and 22 which project through the tile lining 13 and insulation 12 and are secured to the shell 11. A top piece 23, upon which the bottom 18 of a girder rests, extends between and is secured to the side members 21 and 22. The girders are anchored to support 20 by anchor bolts 24 comprising a stud 25 having a nut 26 fastened thereto at one end thereof, the nut cooperating with a supporting plate 27 secured to end plate 17 in spaced relationship with bottom 18 of the girder. Plate 27 is also supported by vertically extending member 28. Stud 25 extends through bottom 18 of the girder and through a slot 29 in top piece 23 of support 20, the opposite end of stud 25 having a nut secured thereto which nut cooperates with the under surface of top piece 23. Slots 29 are elongated longitudinally of girders 16 and studs 25 are of a metal having a higher coefficient of expansion than the metal of which beams 16 are formed so that the girders are free to expand longitudinally, as will hereinafter be fully set forth.

Overflow spaces 30 and 31 are formed between the opposite longitudinal sides of the grid floor by baffle plates 32 and 33 extending medially of chamber 15 in spaced relationship with the inner periphery of tile lining 13. Baffles 32 and 33 each comprise an upper plate 34 which extends upwardly to a point above the beams 16 and transversely of the chamber 15 in the same direction as the girders 16. Upper plate 34 is secured along its bottom edge to the top of the adjacent girder 16 and at spaced intervals along the top edge thereof to struts 35 by means of members 36. Struts 35 are each fastened to a mounting member 37 which extends through the tile lining 13 and insulation 12 and is fastened to shell 11 by welding or any other desirable means. Baffles 32 and 33 each also comprise a bottom plate 38, similar to plate 34, extending transversely of the chamber and downwardly below the beams to a point cloosely adjacent the inner periphery of the lining 13 along the bottom of the chamber. Plate 38 is secured along the top thereof to the bottom of the adjacent girder 16 and is secured along the bottom edge thereof to a plurality of spaced fastening members 39 which project through tile 13, insulation 12 and are secured to shell 11. In this manner, catalyst overflow spaces are formed along the opposite sides of the grid bottom. The space 30 has outlets 40 and 41, while the space 31 has an outlet 42

Figure 4:
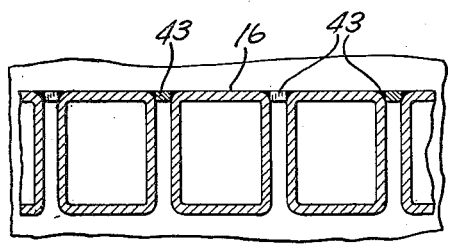
Fig. 4 is a fragmentary sectional view taken on the line 4—4 of Fig. 1 and on an enlarged scale.

Spaced openings are formed in the grid by space closing means comprising sealing strips of catalyst impervious material which cover the spaces between adjacent girders 16 at intervals throughout the length of said spaces. As shown more particularly in Figs. 1 and 4, a plurality of flat metallic sealing strips 43, each of which is of a length considerably less than the length of a space between adjacent girders 16, are secured along the opposite side edges thereof to adjacent girders 16 at the top of said girders by welding. Strips 43 are spaced from one another to provide openings or spaced slots 54 throughout the length of the space between adjacent girders. The size of the openings 53 and the number thereof may be varied over a wide range by varying the length of strips 43 or the number thereof in a space between the beams and by varying the distance adjacent strips in said space are positioned from one another. By way of example, in a catalyst vessel having an inside chamber of approximately forty feet the sealing strips 43 would be approximately sixteen inches long and the ends of adjacent sealing strips would be spaced apart approximately six inches so that slots six inches long spaced sixteen inches apart would be formed throughout the length of a space. Strips of other lengths may be used and may be spaced either a greater or lesser distance apart.

A semi-circular shaped sealing plate 44 is secured to the top 19 of girders 16 at the opposite ends thereof and extends between baffles 32 and 33. Plate 44 overlaps the end of the top 19 of girder 16 and is secured thereto by bolts 45 which bolts extent through an elongated slot 46 in plate 44, the slots 46 being elongated in a direction longitudinally of girders 16. Plates 44, as shown more particularly in Fig. 3 extend through tile 13, insulation 12 and are fastened by bolts 48 to a plurality of spaced lugs 47 secured to shell 11. Top 19 of girders 16 has an opening 49 in vertical alignment with the anchor bolt 24 which opening is covered by a removable cover plate 50 secured to top 19 permitting access to said bolt in the event removal of a beam becomes necessary. Inwardly of the end plates 17, top 19 of girders 16 has an outlet opening 51 covered by a filter 52 through which opening any gases in the girder 16 may escape from within said girders upon the heating thereof. The filter is such that catalyst is prevented from entering opening 51.

Beneath the girders 16, a semi-circular tile lining 53 is positioned to enclose the supports 20 upon which girders 16 are supported.

In constructing a grid floor of the present invention, it is merely necessary to secure the individual girders 16 to supports 20 by anchor bolts 24. Since the top piece 23 of supports 20 is slotted as is the semi-circular sealing plate 44 and the end 55 is in spaced relationship with the inner periphery of the tile lining 13, girders 16 are permitted to expand longitudinally thereof without damage to the shell or lining. Anchor bolts 24 preferably will have a coefficient of expansion greater than that of the supporting plate 27 and top piece 23 so that expansion of a girder will not cause undue vertical movement or vibration. Should individual beams 16 become corroded or otherwise worn, they may readily be replaced by loosening and removing anchor bolts 24 and bolts 45 and hoisting the beam outwardly of the vessel. Should the strips 43 be welded to both of the adjacent beams, as shown in the drawings and described herein, the welding attaching the strips to the adjacent beam not to be removed, must necessarily be cut by a torch or otherwise prior to removing a beam. Also plate 44 must be bent upwardly adjacent the ends of the beam to be removed.

Since changes may be effected in the forms of the invention selected for disclosure without departing from the principles thereof, it will be understood that the invention is not to be limited excepting by the scope of the appended claims.

What is claimed is:

1. In a catalyst chamber, a supporting floor comprising a grid on which a bed of finely divided catalyst is directly supported, said floor being positioned in spaced relationship to the bottom of the chamber, the chamber having a catalyst inlet below said floor, said grid comprising a plurality of horizontally positioned, rectangular-shaped, hollow, metallic beams extending in substantially the same plane transversely of the chamber to a point short of the inner peripheral surface of the chamber adjacent the opposite ends of the beams, the beams being laterally spaced from one another such distance as to form longitudinally extending slots therebetween, which slots are relatively narrow in comparison to the width of said beams, substantially vertically extending end closure plates associated with the beams and closing said beams in a fluid-tight manner adjacent the opposite ends thereof, the plates being in spaced relationship inwardly of said beams from said ends so that an end portion of the beams extends outwardly of the plates, supporting means on the wall of the chamber adjacent opposite ends of the beams and disposed beneath and in supporting relationship to said ends of the beams, a lug secured to said end plates and projecting therefrom intermediate the top and bottom of the end plates and above said end portions, anchor bolts securing the beams in relationship to the supporting means, the bolts being of a metal having a higher coefficient of expansion than the metallic beams, said anchor bolts being associated with the lugs and the supports adjacent the end portions and extending through the bottom of the end portions and a slot in the supports, and a plurality of sealing strips closing the slots between laterally adjacent beams at intervals longitudinally of said beams thereby providing a plurality of spaced openings through said floor, said sealing strips being welded to the upper edges of said adjacent beams.

2. A vertically extending cylindrically-shaped catalyst chamber having an inverted substantially conical-shaped bottom portion with a gas opening at the apex thereof, a supporting floor comprising a grid on which a bed of finely divided catalyst is directly supported, said floor being positioned in spaced relationship with the apex of the bottom portion, the chamber having a catalyst inlet below said floor, said grid comprising a plurality of horizontally positioned, rectangular-shaped, hollow, metallic beams extending in the same plane transversely of the chamber to a point short of the inner peripheral surface of the chamber adjacent the opposite ends of the beams, the beams being laterally spaced from one another such distance as to form longitudinally extending slots therebetween, which slots are relatively narrow in comparison to the width of said beams, the beams being closed at the opposite ends thereof, said beams having an outlet port therein intermediate the opposite ends thereof, a fluid filter in the outlet port of said beams, supporting means on the wall of the chamber adjacent opposite ends of said beams and disposed beneath and in supporting relationship to said ends of the beams, said supports having therein a slot elongated in a direction longitudinally of the beams, anchor bolts removably securing the beams in relationship to the supporting means, said bolts being associated with said beams and the supports adjacent the opposite ends of the beams and extending through said slots, and a plurality of sealing strips closing the slots between laterally adjacent beams at intervals longitudinally of said beams thereby providing a plurality of spaced openings through said floor, said sealing strips being welded to the upper edges of said adjacent beams.

3. A vertically extending cylindrically-shaped catalyst chamber having an inverted substantially conical-shaped bottom portion with a gas opening at the apex thereof, a supporting grid to directly support a catalyst bed, said grid being of such width as to be in spaced relationship at opposite sides thereof with the chamber wall adjacent said sides, the grid being positioned in spaced relationship with the apex of the bottom portion, the chamber having a catalyst inlet below said floor, said grid comprising a plurality of horizontally positioned, rectangular-shaped, hollow, metallic beams extending in the same plane transversely of the chamber to a point short of the inner peripheral surface of the chamber adjacent the opposite ends of the beams, the beams being laterally spaced from one another such distance as to form longitudinally extending slots therebetween, which slots are relatively narrow in comparison to the width of said beams, the beams being closed at the opposite ends thereof, said beams having an outlet port therein intermediate the opposite ends thereof, a fluid filter in the outlet port of said beams, supporting means on the wall of the chamber adjacent opposite ends of said beams and disposed beneath and in supporting relationship to said ends of the beams, said supports having therein a slot elongated in a direction longitudinally of the beams, anchor bolts removably securing the beams in relationship to the supporting means, said bolts being associated with said beams and the supports adjacent the opposite ends of the beams and extending through said slots, a plurality of metallic sealing strips closing the spaces between laterally adjacent beams at intervals longitudinally of said beams thereby providing a plurality of spaced openings through said floor, said sealing strips being welded to the upper edges of said adjacent beams, baffles extending longitudinally of the grid and medially of the chamber, the baffles engaging beams at the opposite sides of the grid in a fluid-tight manner and projecting into the chamber to an elevation higher than the grid thereby separating the grid and the spaces adjacent said sides thereof to form separate overflow spaces, said overflow spaces having an outlet opening, and substantially semi-circular shaped sealing plates in fluid-tight relationship with said wall and with the beam of the grid at the opposite ends of the beams, the sealing plates being so disposed in relationship with the beams that the beams have longitudinal movement relative thereto.

4. A grid for a catalyst chamber having a catalyst inlet at the bottom thereof, said grid being disposed above the inlet and adapted to support a bed of finely divided catalyst directly thereon, the grid comprising a plurality of rectangular-shaped, hollow, metallic beams adapted to extend in the same horizontal plane transversely of a chamber to a point short of the inner peripheral surface of said chamber adjacent the opposite ends of the beams, the beams being laterally spaced from one another such distance as to form longitudinally extending slots therebetween, which slots are relatively narrow in comparison to the width of said beams, supporting means adapted to cooperate with the wall of a chamber and associated with opposite ends of the beams in supporting relationship to said ends of the beams, said supporting means having therein a slot elongated in a direction longitudinally of the beams, anchor bolts removably securing the beams in relationship to the supporting means, said bolts being associated with said beams and the supporting means adjacent the opposite ends of the beams and extending through said slots, and slot closing means for closing portions of the slots between laterally adjacent beams, said slot closing means comprising a plurality of strips of catalyst impervious material positioned between laterally adjacent beams at intervals longitudinally of said beams thereby providing a plurality of spaced openings through said floor.

5. A grid for a catalyst chamber having a catalyst inlet at the bottom thereof, said grid being disposed above the inlet and adapted to support a bed of finely divided catalyst directly thereon, the grid comprising a plurality of rectangular-shaped, hollow, metallic beams adapted to extend in the same horizontal plane transversely of a chamber to a point short of the inner peripheral surface of said chamber adjacent the opposite ends of the beams, the beams being laterally spaced from one another such distance as to form longitudinally extending slots therebetween, which slots are relatively narrow in comparison to the width of said beams, and closed at the opposite ends thereof, said beams having an outlet port intermediate the opposite ends thereof, a fluid filter in the outlet port, supporting means adapted to cooperate with the wall of a chamber and associated with opposite ends of the beams in supporting relationship to said ends of the beams, said supporting means having therein a slot elongated in a direction longitudinally of the beams, anchor bolts removably securing the beams in relationship to the supporting means, said bolts being associated with said beams and the supports adjacent the opposite ends of the beams and extending through said slots, and a slot closing means for closing portions of the slots between laterally adjacent beams, said slot closing means comprising a plurality of strips of catalyst impervious material positioned between laterally adjacent beams at intervals longitudinally of said beams thereby providing a plurality of spaced openings through said floor.

6. A grid for a catalyst chamber having a catalyst inlet at the bottom thereof, said grid being disposed above the inlet and adapted to support a bed of finely divided catalyst directly thereon, the grid comprising a plurality of rectangular-shaped, hollow, metallic beams adapted to extend in the same horizontal plane transversely of a chamber to a point short of the inner peripheral surface of said chamber adjacent the opposite ends of the beams, the beams being laterally spaced from one another such distance as to form longitudinally extending slots therebetween, which slots are relatively narrow in comparison to the width of said beams, supporting means adapted to cooperate with the wall of a chamber and associated with opposite ends of the beams in supporting relationship to said ends of the beams, said supporting means having therein a slot elongated in a direction longitudinally of the beams, anchor bolts having a higher coefficient of expansion than the metallic beams, said bolts removably securing the beams in relationship to the supporting means, said bolts being associated with said beams and the supporting means adjacent the opposite ends of the beams and extending through said slots, and a plurality of metallic sealing strips closing the slots between laterally adjacent beams at intervals longitudinally of said beams thereby providing a plurality of spaced openings through said grid, said sealing strips being welded to the upper longitudinal edges of said adjacent beams.

7. A grid for a catalyst chamber having a catalyst inlet at the bottom thereof, said grid being disposed above the inlet and adapted to support a bed of finely divided catalyst directly thereon, the grid comprising a plurality of rectangular-shaped, hollow, metallic beams adapted to extend in the same horizontal plane transversely of a chamber to a point short of the inner peripheral surface of said chamber adjacent the opposite ends of the beams, the beams being laterally spaced from one another such distance as to form longitudinally extending slots therebetween, which slots are relatively narrow in comparison to the width of said beams, and closed at the opposite ends thereof, said beams having an outlet port intermediate the opposite ends thereof, a fluid filter in the outlet port, supporting means adapted to cooperate with the wall of a chamber and associated with opposite ends of the beams in supporting relationship to said ends of the beams, said supporting means having therein a slot elongated in a direction longitudinally of the beams, anchor bolts having a higher coefficient of expansion than the metallic beams, said bolts removably securing the beams in relationship to the supporting means, said bolts being associated with said beams and the supporting means adjacent the opposite ends of the beams and extending through said slots, and a plurality of metallic sealing strips closing the slots between laterally adjacent beams at intervals longitudinally of said beams thereby providing a plurality of spaced slots through said floor, said sealing strips being welded to the upper longitudinal edges of said adjacent beams.

8. In a catalyst chamber, a supporting floor comprising a grid on which a bed of finely divided catalyst is supported, the floor being positioned in spaced relationship to the bottom of the chamber, the chamber having a catalyst inlet below said floor, said grid comprising a plurality of elongated beams extending in substantially the same horizontal plane transversely of the chamber to a point short of the inner peripheral surface of said chamber adjacent the ends of the beams, the beams being laterally spaced from one another such distance as to form longitudinally extending slots therebetween, which slots are relatively narrow in comparison to the width of said beams, supporting means on the wall of the chamber adjacent opposite ends of said beams and disposed in supporting relationship to said ends of the beams, anchoring means associated with said ends of the beams and the supporting means and anchoring the beams in longitudinally movable relationship in respect to said supporting means, and slot closing means for closing portions of the slots between laterally adjacent beams, said slot closing means comprising a plurality of strips of catalyst impervious material positioned between laterally adjacent beams at spaced intervals longitudinally of said beams thereby providing a plurality of spaced openings through which said catalyst flows from the catalyst inlet into the portion of the chamber above said floor.

9. In a catalyst chamber, a supporting floor comprising a grid on which a bed of finely divided catalyst is supported, the floor being positioned in spaced relationship to the bottom of the chamber, the chamber having a catalyst inlet below said floor, said grid comprising a plurality of elongated beams extending in substantially the same horizontal plane transversely of the chamber to a point short of the inner peripheral surface of said chamber adjacent the ends of the beams, the beams being laterally spaced from one another such distance as to form longitudinally extending slots therebetween, which slots are relatively narrow in comparison to the width of said beams, supporting means on the wall of the chamber adjacent opposite ends of said beams and disposed in supporting relationship to said ends of the beams, removable anchoring means associated with said ends of the beams and the supporting means and anchoring the beams in longitudinally movable relationship in respect to said supporting means, and slot closing means for closing portions of the slots between laterally adjacent beams, said slot closing means comprising a plurality of strips of catalyst impervious material positioned between laterally adjacent beams at spaced intervals longitudinally of said beams thereby providing a plurality of spaced openings through which said catalyst flows from the catalyst inlet into the portion of the chamber above said floor.

10. In a catalyst chamber, a supporting floor comprising a grid on which a bed of finely divided catalyst is supported, the floor being positioned in spaced relationship to the bottom of the chamber, the chamber having a catalyst inlet below said floor, said grid comprising a plurality of elongated rectangular-shaped, hollow, metallic beams extending in substantially the same horizontal plane transversely of the chamber to a point short of the inner peripheral surface of said chamber adjacent the ends of the beams, the beams being laterally spaced from one another such distance as to form longitudinally extending slots therebetween, which slots are relatively narrow in comparison to the width of said beams, supporting means on the wall of the chamber adjacent opposite ends of said beams and disposed in supporting relationship to said ends of the beams, anchoring means associated with said ends of the beams and the supporting means and anchoring the beams in longitudinally movable relationship in respect to said supporting means, and slot closing means for closing portions of the slots between laterally adjacent beams, said slot closing means comprising a plurality of strips of catalyst impervious material positioned between laterally adjacent beams at spaced intervals longitudinally of said beams thereby providing a plurality of spaced openings through which said catalyst flows from the catalyst inlet into the portion of the chamber above said floor.

11. In a catalyst chamber, a supporting floor comprising a grid on which a bed of finely divided catalyst is supported, the floor being positioned in spaced relationship to the bottom of the chamber, the chamber having a catalyst inlet below said floor, said grid comprising a plurality of elongated rectangular-shaped, hollow, metallic beams extending in substantially the same horizontal plane transversely of the chamber to a point short of the inner peripheral surface of said chamber adjacent the ends of the beams, the beams being laterally spaced from one another such distance as to form longitudinally extending slots therebetween, which slots are relatively narrow in comparison to the width of said beams, supporting means on the wall of the chamber adjacent opposite ends of said beams and disposed in supporting relationship to said ends of the beams, removable anchoring means associated with said ends of the beams and the supporting means and anchoring the beams in longitudinally movable relationship in respect to said supporting means, and slot closing means for closing portions of the slots between laterally adjacent beams, said slot closing means comprising a plurality of strips of catalyst impervious material positioned between laterally adjacent beams at spaced intervals longitudinally of said beams thereby providing a plurality of spaced openings through which said catalyst flows from the catalyst inlet into the portion of the chamber above said floor.

12. In a catalyst chamber, a supporting floor comprising a grid on which a bed of finely divided catalyst is supported, the floor being positioned in spaced relationship to the bottom of the chamber, the chamber having a catalyst inlet below said floor, said grid comprising a plurality of elongated beams extending in substantially the same horizontal plane transversely of the chamber to a point short of the inner peripheral surface of said chamber adjacent the ends of the beams, the beams being laterally spaced from one another such distance as to form longitudinally extending slots therebetween, which slots are relatively narrow in comparison to the width of said beams, supporting means on the wall of the chamber adjacent opposite ends of said beams and disposed in supporting relationship to said ends of the beams, anchoring means associated with said ends of the beams and the supporting means and anchoring the beams in longitudinally movable relationship in respect to said supporting means, and slot closing means for closing portions of the slots between laterally adjacent beams, said slot closing means comprising a plurality of strips of catalyst impervious material positioned between laterally adjacent beams at spaced intervals longitudinally of said beams thereby providing a plurality of spaced openings through which said catalyst flows from the catalyst inlet into the portion of the chamber above said floor, said sealing strips being secured to the upper longitudinal edge of at least one of the beams adjacent thereto.

13. In a catalyst chamber, a supporting floor comprising a grid on which a bed of finely divided catalyst is supported, the floor being positioned in spaced relationship to the bottom of the chamber, the chamber having a catalyst inlet below said floor, said grid comprising a plurality of elongated beams extending in substantially the same horizontal plane transversely of the chamber to a point short of the inner peripheral surface of said chamber adjacent the ends of the beams, the beams being laterally spaced from one another such distance as to form longitudinally extending slots therebetween, which slots are relatively narrow in comparison to the width of said beams, supporting means on the wall of the chamber adjacent opposite ends of said beams and disposed in supporting relationship to said ends of the beams, anchoring means associated with said ends of the beams and the supporting means and anchoring the beams in longitudinally movable relationship in respect to said supporting means, and slot closing means for closing portions of the slots between laterally adjacent beams, said slot closing means comprising a plurality of strips of catalyst impervious material positioned between laterally adjacent beams at spaced intervals longitudinally of said beams thereby providing a plurality of spaced openings through which said catalyst flows from the catalyst inlet into the portion of the chamber above said floor, said sealing strips being welded to the upper longitudinal edges of said adjacent beams.

14. In a catalyst chamber, a supporting floor comprising a grid on which a bed of finely divided catalyst is supported, the floor being positioned in spaced relationship to the bottom of the chamber, the chamber having a catalyst inlet below said floor, said grid comprising a plurality of elongated beams extending in substantially the same horizontal plane transversely of the chamber to a point short of the inner peripheral surface of said chamber adjacent the ends of the beams, the beams being laterally spaced from one another such distance as to form longitudinally extending slots therebetween, which slots are relatively narrow in comparison to the width of said beams, supporting means on the wall of the chamber adjacent opposite ends of said beams and disposed beneath and in supporting relationship to said ends of the beams, said supporting means having therein a slot elongated in a direction longitudinally of the beams, anchor bolts removably securing the beams in relationship to the supports, said bolts being associated with said beams and the supports adjacent the opposite ends of the beams and extending through said slots, and slot closing means for closing portions of the slots between laterally adjacent beams, said slot closing means comprising a plurality of strips of catalyst impervious material positioned between laterally adjacent beams at spaced intervals longitudinally of said beams thereby providing a plurality of spaced openings through which said catalyst flows from the catalyst inlet into the portion of the chamber above said floor.

15. In a catalyst chamber, a supporting floor comprising a grid on which a bed of finely divided catalyst is supported, the floor being positioned in spaced relationship to the bottom of the chamber, the chamber having a catalyst inlet below said floor, said grid comprising a plurality of elongated beams extending in substantially the same horizontal plane transversely of the chamber to a point short of the inner peripheral surface of said chamber adjacent the ends of the beams, the beams being laterally spaced from one another such distance as to form longitudinally extending slots therebetween, which slots are relatively narrow in comparison to the width of said beams, supporting means on the wall of the chamber adjacent opposite ends of said beams and disposed beneath and in supporting relationship to said ends of the beams, said supporting means having therein a slot elongated in a direction longitudinally of the beams, anchor bolts of a metal having a higher coefficient of expansion than the metallic beams, removably securing the beams in relationship to the supports, said bolts being associated with said beams and the supports adjacent the opposite ends of the beams and extending through said slots, and slot closing means for closing portions of the slots between laterally adjacent beams, said slot closing means comprising a plurality of strips of catalyst impervious material positioned between laterally adjacent beams at spaced intervals longitudinally of said beams thereby providing a plurality of spaced openings through which said catalyst flows from the catalyst inlet into the portion of the chamber above said floor.

16. In a catalyst chamber, a supporting floor comprising a grid on which a bed of finely divided catalyst is supported, the floor being positioned in spaced relationship to the bottom of the chamber, the chamber having a catalyst inlet below said floor, said grid comprising a plurality of elongated beams extending in substantially the same horizontal plane transversely of the chamber to a point short of the inner peripheral surface of said chamber adjacent the ends of the beams, the beams being laterally spaced from one another such distance as to form longitudinally extending slots therebetween, which slots are relatively narrow in comparison to the width of said beams, said beams being closed at the opposite ends thereof, the beams having an outlet port therein intermediate the opposite ends thereof, a fluid filter in the outlet port of said beams, supporting means on the wall of the chamber adjacent opposite ends of the beams and disposed in supporting relationship to said ends of the beams, anchoring means associated with said ends of the beams and the supporting means and anchoring the beams in longitudinally movable relationship in respect to said supporting means, and slot closing means for closing portions of the slots between laterally adjacent beams, said slot closing means comprising a plurality of strips of catalyst impervious material positioned between laterally adjacent beams at spaced intervals longitudinally of said beams thereby providing a plurality of spaced openings through which said catalyst flows from the catalyst inlet into the portion of the chamber above said floor.

17. In a catalyst chamber, a supporting floor comprising a grid on which a bed of finely divided catalyst is supported, the floor being positioned in spaced relationship to the bottom of the chamber, the chamber having a catalyst inlet below said floor, said grid comprising a plurality of elongated beams extending in substantially the same horizontal plane transversely of the chamber to a point short of the inner peripheral surface of said chamber adjacent the ends of the beams, the beams being laterally spaced from one another such distance as to form longitudinally extending slots therebetween, which slots are relatively narrow in comparison to the width of said beams, end closure plates associated with the beams and closing said beams in a fluid-tight manner adjacent the opposite ends thereof, the plates being in spaced relationship inwardly of the beams from said ends so that an end portion of said beams extends outwardly of the plates, supporting means on the wall of the chamber adjacent opposite ends of said beams and disposed in supporting relationship to said ends of the beams, anchoring means associated with said ends of the beams and the supporting means and anchoring the beams in longitudinally movable relationship in respect to said supporting means, and slot closing means for closing portions of the slots between laterally adjacent beams, said slot closing means comprising a plurality of strips of catalyst impervious material positioned between laterally adjacent beams at spaced intervals longitudinally of said beams thereby providing a plurality of spaced openings through which said catalyst flows from the catalyst inlet into the portion of the chamber above said floor.

EGON F. BRUMMERSTEDT.

REFERENCES CITED

The following references are of record in the file of this patent:

UNITED STATES PATENTS

| Number | Name | Date |
|---|---|---|
| 624,893 | Davis | May 9, 1899 |
| 644,531 | Morton | Feb. 27, 1900 |
| 1,716,084 | Percy | June 4, 1929 |
| 1,992,909 | Davis | Feb. 26, 1935 |
| 2,090,217 | Merriam | Aug. 17, 1937 |
| 2,108,087 | Thayer | Feb. 15, 1938 |
| 2,173,825 | Curtis | Sept. 26, 1939 |
| 2,396,109 | Martin | Mar. 5, 1946 |
| 2,399,050 | Martin | Apr. 23, 1946 |

FOREIGN PATENTS

| Number | Country | Date |
|---|---|---|
| 1,703 of 1894 | Great Britain | Dec. 22, 1894 |